United States Patent Office 3,002,979
Patented Oct. 3, 1961

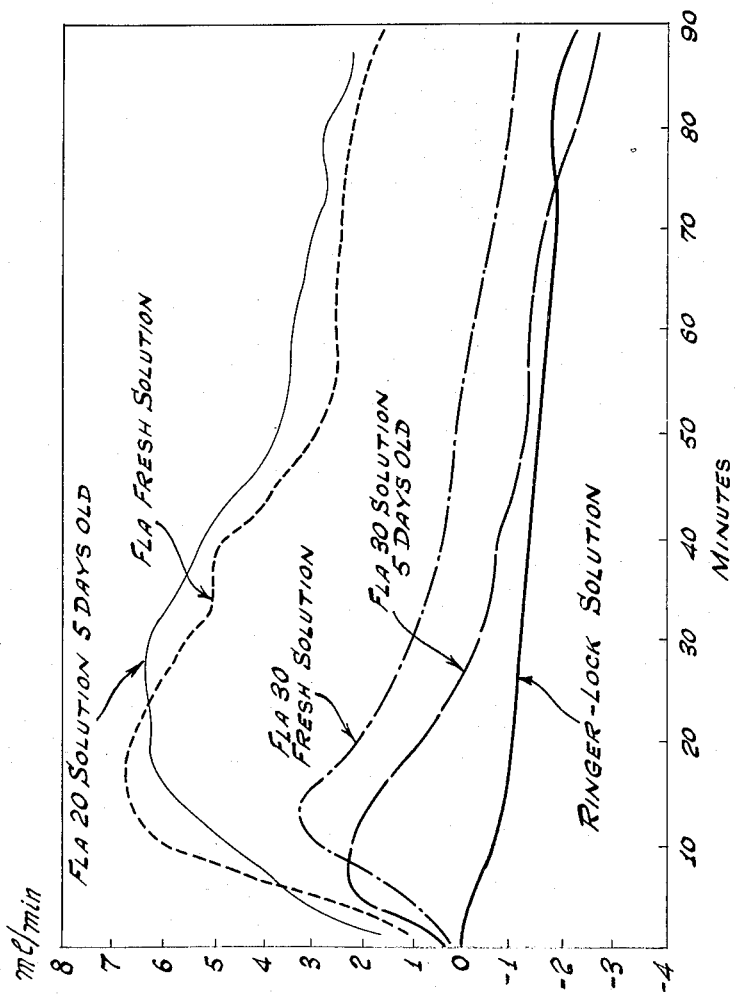

3,002,979
FLAVONE-7-OXY-ACETAMIDES
Josef Klosa, Berlin-Zehlendorf, Germany, assignor to Delmar Chemicals, Limited, Lachine, Quebec, Canada, a corporation of Canada
Filed Mar. 10, 1960, Ser. No. 14,079
7 Claims. (Cl. 260—345.2)

The present invention relates to novel flavone-7-oxy-acetamides of the following formula:

$$\underset{R_1}{\overset{R}{>}}N-CO-CH_2-O-\text{[flavone]}-C_6H_5$$

wherein R and $R_1$ may be H, lower alkyl groups of 1–4 carbon atoms which, with the nitrogen atom also form a ring system selected from piperidine, morpholine and pyrrolidine rings. Such a ring may also carry alkyl substituents. R and $R_1$ may also be aryl groups and alkyl or alkoxy substituted aryl groups as for example p-ethoxyphenyl. They may stand also for aralkyl groups, such as benzyl or phenylpropyl. When R or $R_1$ is alkyl, such alkyl group may be a straight or branched chain group. It may also carry substituents, so that R and $R_1$ may also be hydroxyethyl-, 1.2-dimethylethanol-(1), dimethyl-aminoethyl-, diethylaminopropyl-, and so forth.

It was found that these compounds can be prepared by the following methods:

A. Flavone-7-oxy-acetic acid in the form of a reactive derivative may be reacted with an amine.

B. A flavone-7-oxy-acetyl halide may be reacted with an amine.

C. A flavone-7-oxy-acetic ester may be reacted with an amine.

D. A 7-oxy-flavone or an alkaline salt thereof may be reacted with a halogen acetamide of the formula $$\underset{R_1}{\overset{R}{>}}N-CO-CH_2-Hal$$

in which formula R and $R_1$ have the same significance as above. This last reaction may be carried out in a suitable solvent, as for example one of the alcohols, benzol, toluol, and it may be carried out also using water as the solvent. Acetone or other ketones may be used as well. When 7-oxy-flavone is used as the starting material, (method D) the reaction may be carried out in the presence of an alkali carbonate and acetone, toluol, benzol, xylol, alcohols, dioxane may be used as solvents. The halogen acetamide may be a chloro-, bromo-, or iodo-acetamide, but for economic reasons the chloro-acetamides are preferred. The addition of a small amount of alkali-bromide or iodide furthers and speeds up the reaction.

When a flavone-oxy-acetyl-halogenide (method B) or ester (method C) is reacted with an amine the reaction may be carried out in or without the presence of a solvent or diluent. As flavone-oxy-acetyl-esters, the methyl-ethyl-, propyl-, or generally speaking the esters of lower alcohols may be used. To speed up the reaction, catalytic amounts of alkaline metals may be added to the reaction. As flavone-oxy-acetyl-halogenides, the chloride and bromide are useful.

Flavone-7-oxy-acetic-alkanolesters and flavone-7-oxy-acetic-alkanolamine-esters are known (British Patent 803,372). These esters appear to provide a good coronary-dilating activity and a low toxicity. However, their activity is of short duration, presumably because they are rapidly hydrolyzed to the much less active and less soluble flavone-7-oxy-acetic acid.

To be therapeutically useful it is important that the activity be sustained.

The compounds of the present invention have the following advantages:

(a) Low toxicity.

(b) Excellent cardio-therapeutic activity, combatting cardiac insufficiency particularly by the coronary-dilating ability and in particular the ability to dilate the cardiac arteries.

(c) Good stability in the sense that they undergo practically no hydrolysis under physiological conditions.

The following experiment reinforces the above:

When 3 gms. of one of the compounds described in British Patent 803,372 and 3 gms. of one of the compounds described in the present invention are kept in an aqueous alcoholic solution, or in an aqueous suspension at room temperature, it will be found that the esters are hydrolyzed after a few hours, whereas the amides prepared according to the present invention can be recovered unchanged. The following table sets forth the comparative activity of khellin, flavone-7-oxy-acetic ethylester (British Patent 803,372) and two of the compounds of the present invention:

| Name of Compound | Code No. | $LD_{50}$ in mg./kg. | Coronary-dilating activity |
|---|---|---|---|
| Khellin | K | 160 | 1 |
| Flavone-7-oxy-acetic acid ethyl-ester. | Fla 1 | 3,200 | 14 |
| Flavone-7-oxy-acetic acid amide | Fla 2 | 4,860 | 16 |
| Flavone-7-oxy-acetic acid N-diethylamide. | Fla 5 | 3,650 | 20 |

The determination of the toxicity was done intraperitonically in white mice. The coronary-dilating activity was determined according to the method described by Langendorff (Pfleuger's Archiv., vol. 61, p. 219 (1895)) as modified by Morawitz and A. Zahn (Zbl. Physiol., vol. 26, p. 465 (1912)).

The protracted and steady activity of the new compounds of the present invention can be easily demonstrated on the coronary flow. Comparing two typical compounds:

Flavone-7-oxy-acetic acid-(N-beta-dimethylamino)-ethylester hydrochloride (Fla 30) and
Flavone-7-oxy-acetic acid-(beta-diethylamino-ethylene)-amide (Fla 20).

We find that both are well soluble in water. They are both dissolved in a Ringer-Locke solution in a concentration of 4 mg./L. The coronary flow was measured in an experimental setup according to Langendorff-Morawitz. The curves represent the average of 5 experiments. The solutions were tried:

(a) Fresh—used immediately after having been prepared; and (b) after standing 5 days. Before testing the solutions were stirred in a constant temperature bath at 37° for two hours.

In the curves the abscissa gives the time in minutes of the perfusion (on the isolated heart tissue), while the ordinate represents the coronary flow in ml./min.

It is obvious that Fla 20 has a very much greater and also a more prolonged activity.

In the following examples some of the compounds of the present invention are more fully described.

*Example 1*

Flavone-7-oxy-acetamide (method D)

($R=R_1=H$)

11.9 gms. 7-oxy-flavone, 7 gms. chloro-acetamide and 10 gms. anhydrous potassium carbonate are stirred and heated to reflux with 250 ml. acetone for 8 hours. The mixture is allowed to cool and stand for 4 hours, the supernatant liquid is poured off and from this solution the acetone is removed by distillation. The residue of this operation is added to the solids left behind after the supernatant is decanted and the joined solids are stirred with 200 ml. water at room temperature. Much goes into solution. This aqueous suspension is filtered, the precipitate washed with water and then recrystallized from alcohol. Yield about 80%. M.P. 243–245° C.

From the aqueous filtrate some unreacted 7-oxy-flavone may be recovered by acidifying. The compound is $$C_{17}H_{13}O_4N$$

*Microanalysis.*—Theory: C, 69.15%; H, 4.40%; N, 4.74%. Found: C, 69.24%, H, 4.38%; N, 4.92%.

Example 2

Flavone-7-oxy-acetyl-(N-phenylisopropyl)-amide (method D)

$$(R=H;\ R_1=C_6H_5-CH_2-CH-CH_3)$$

5 gms. of the sodium salt of 7-oxy-flavone are refluxed in 30 ml. toluol for 4 hours with 4.2 gms. chloro-acetyl-(N-phenylisopropyl)amide. After this refluxing period the solution is filtered hot. To the filtrate some petroleum ether is added. The new amide crystallizes. The product can be recrystallized from alcohol. M.P. 167–169° C.

From the solids, which were filtered off at the end of the reaction, an additional quantity of the product can be obtained by treatment with water. The overall yield is about 85%. The compound is $C_{26}H_{23}O_4N$.

*Microanalysis.*—Theory: C, 75.54%; H, 5.56%; N, 3.38%. Found: C, 75.61%; H, 5.51%; N, 3.45%.

Example 3

Flavone-7-oxy-acetyl - (p - ethoxyphenyl)-amide (method D)

$$(R=H;\ R_1=C_2H_5-O-C_6H_4-)$$

5 gms. of the sodium salt of 7-oxy-flavone are refluxed in 50 ml. alcohol anhydrous with 4.2 gms. chloro-acetyl-p-ethoxyanilide. The solution is filtered hot. The desired product crystallizes from the alcohol solution on cooling as a white crystalline powder. It may be recrystallized from alcohol. M.P. 193–195° C. The compound is $C_{25}H_{21}O_5N$.

Theory _____ N, 3.37%
Found _____ N, 3.32%

Example 4

Flavone-7-oxy-acetyl-(p-oxyphenyl)-amide (method D)

$$(R=H;\ R_1=HO-C_6H_4-)$$

Prepared as described in Example 3 by reacting the sodium salt of 7-oxy-flavone with chloro-acetyl-(p-oxyphenyl)-amide. M.P. 203–205° C. Alcoholic solutions of this compound discolor on standing. The compound is $C_{23}H_{17}O_5N$.

Theory _____ N, 3.61%
Found _____ N, 3.70%

Example 5

Flavone-7-oxy-acetyl-antipyrine-(4)-amide (method D)

$$\left[R=H;\ R_1=CH_3-C=C-\ \underset{\underset{C_6H_5}{N}}{\overset{CH_3-N}{|}}\ \overset{C=O}{|}\right]$$

The compound is prepared similarly to Example 3 from the sodium salt of 7-oxy-flavone and 4-(chloro-acetyl)-antipyrine-amide. This compound may be recrystallized from propylene glycol. M.P. 243–245° C. The compound is $C_{28}H_{23}O_5N_3$.

Theory _____ N, 8.73%
Found _____ N, 8.84%

Example 6

(a) Flavone-7-oxy-acetyl-diethylamide (method C)

$$(R=R_1=C_2H_5-)$$

6.2 gms. flavone-7-oxy-acetic ethylester and 6 ml. diethylamine are refluxed for 6 hours in 50 ml. anhydrous methanol. The solution is then concentrated to half its volmue, diluted with water and acidified. The desired compound precipitates as a white crystalline powder. It may be recrystallized from alcohol or acetone. M.P. 126–128° C. The compound is $C_{21}H_{21}O_4N$.

Theory _____ N, 3.98%
Found _____ N, 4.01%

In the same way there were prepared:

(b) Flavone-7-oxy-acetyl-dimethylamide $$(R=R_1=CH_3-)$$

$C_{19}H_{17}O_4N$
Theory _____ N, 4.33%
Found _____ N, 4.38%

(c) Flavone-7-oxy-acetyl-N-morpholine-amide (R and $R_1$ forming a morpholine ring with the N atom). M.P. 180–182° C.:

$C_{21}H_{19}O_5N$
Theory _____ N, 3.86%
Found _____ N, 3.92%

(d) Flavone-7-oxy-acetyl-N-piperidine-amide (R and $R_1$ forming a piperidine ring with the N atom). M.P. 198–200° C.:

$C_{22}H_{21}O_4N$
Theory _____ N, 3.85%
Found _____ N, 3.89%

(e) Flavone-7-oxy-acetyl-N-pyrrolidino-amide (R and $R_1$ forming a pyrrolidino ring with the N atom). M.P. 210° C.:

$C_{21}H_{19}O_4N$
Theory _____ N, 4.01%
Found _____ N, 4.14%

(f) Flavone - 7 - oxy - acetyl - (2,2,6,6-tetramethyl-piperidine)-amide (R and $R_1$ forming a tetra-methyl substituted piperidine ring with the N atom). M.P. 226° C.:

$C_{26}H_{29}O_4N$
Theory __ C, 76.28%; H, 7.15%; N, 3.42%
Found ___ C, 76.31%; H, 7.13%; N, 3.50%

(g) Flavone-7-oxy-acetyl-di-n-butylamide $$(R=R_1=n\text{-butyl-})$$

M.P. 219–221° C.:
$C_{25}H_{29}O_4N$
Theory _____ N, 3.52%
Found _____ N, 3.74%

(h) Flavone-7-oxy-acetyl-mono-iso-butylamide $$(R=H;\ R_1=\text{isobutyl-})$$

M.P. 168–170° C.:
$C_{21}H_{21}O_4N$
Theory _____ N, 4.10%
Found _____ N, 4.24%

(i) Flavone-7-oxy-acetyl-cyclohexylamide $$(R=H;\ R_1=\text{cyclohexyl-})$$

M.P. 214–216° C.:
$C_{23}H_{23}O_4N$
Theory _____ N, 3.81%
Found _____ N, 3.85%

Example 7

(a) Flavone-7-oxy-ethanolamide (method C)

(R=H; R₁=HOCH₂.CH₂—)

3.2 gms. flavone-7-oxy-acetyl-ethylester are refluxed with 2 ml. mono-ethanolamine in 30 ml. methanol. After the first 30 minutes already long, white needle crystals separate. The reaction is complete after an hour. Yield about 85%. M.P. 208–210° C.:

$C_{19}H_{17}O_5N$
Theory -- C, 67.10%; H, 5.01%; N, 4.10%
Found --- C, 67.28%; H, 5.08%; N, 4.31%

(b) Similarly there was prepared (using diethanolamine instead of mono-ethanolamine) the flavone-7-oxy-acetyl-diethanolamide (R=R₁=HOCH₂CH₂—). M.P. 148–150° C.:

$C_{21}H_{21}O_6N$
Theory _____ N, 3.65%
Found _____ N, 3.76%

Example 8

Flavone - 7 - oxy - acetyl - beta - (1.2 - dimethyl) - ethanolamide (method C)

R=H; R₁=HOCH(CH₃).CH(CH₃)—

1.2 gms. flavone-7-oxy-acetyl-methylester, 1 ml. 1.2-dimethylethanolamine and 20 ml. methanol are refluxed for 3 hours. After standing for two days, white crystals deposit. M.P. 164–165° C. Upon diluting the mother liquor with water and making it mildly acid, additional quantities are obtained. Total yield 85%:

$C_{21}H_{21}O_6N$
Theory _____ N, 3.81%
Found _____ N, 3.88%

Example 9

(a) Flavone - 7 - oxy - acetyl - N - methyl - (beta - hydroxyethyl)-amide (method C)

(R=CH₃; R₁=HOCH₂CH₂—)

3.5 gms. flavone-7-oxy-acetyl-n-propylester and 4 ml. N-methylaminoethanol are refluxed for 4 hours in 40 ml. alcohol. The alcohol is removed by distillation. The remaining oil is taken up in a little fresh alcohol and diluted with water. The solution is neutralized with diluted hydrochloric acid. After several days standing, fine needles crystallize. M.P. 244–246° C. Yield about 3.2 gms.:

$C_{20}H_{19}O_5N$
Theory _____ N, 3.96%
Found _____ N, 4.02%

(b) In a similar way was prepared the flavone-7-oxy-acetyl-N-ethyl-(beta-oxyethyl)-amide:

$C_{21}H_{21}O_5N$
Theory _____ N, 3.81%
Found _____ N, 3.97%

Example 10

(a) Flavone-7-oxy-acetyl-(nor-ephedrine)amide (method C)

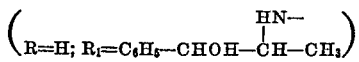

3 gms. flavone-7-oxy-acetyl-ethylester and 2 gms. d.l-nor-ephedrine base are refluxed with 40 ml. methanol for eight hours. Upon cooling and after addition of some water, and acidification with diluted hydrochloric acid to pH 2–3, crystals result which may be recrystallized from alcohol. M.P. 130–132° C. The compound is $C_{26}H_{23}O_5N$.

Microanalysis: Theory: C, 72.72%; H, 5.36%; N, 3.26%. Found: C, 72.81%; H, 5.41%; N, 3.31%.

In the same manner there were prepared:

(b) Flavone-7-oxy - acetyl - (gamma - propanol) - amide (R=H, R₁=HOCH₂CH₂CH₂—). M.P. 186–188° C.

$C_{20}H_{18}O_5N$
Theory _____ N, 3.97%
Found _____ N, 4.05%

(c) Flavone-7-oxy-acetyl-(2 - propanol) - amide (R=H; R₁=CH₃CHOH—CH₂—). M.P. 184–186° C.:

$C_{20}H_{18}O_5N$
Theory _____ N, 3.97%
Found _____ N, 3.92%

(d) Flavone - 7 - oxy - acetyl - (gamma - methoxypropyl)-amide (R=H; R₁=CH₃O—CH₂CH₂CH₂—):

$C_{21}H_{20}O_5N$
Theory _____ N, 3.85%
Found _____ N, 3.98%

Example 11

(a) Flavone - 7 - oxy - acetyl - (beta - N.N - diethylaminoethylene)-amide (method C)

R=H; R₁=(C₂H₅)₂N—CH₂CH₂—

3.2 gms. flavone-7-oxy-acetyl-ethylester and 3 ml. N.N-diethylethylenediamine are refluxed in 30 ml. alcohol for 4 hours. The brown solution is concentrated, resulting in white crystals which are filtered off. Upon dilution with water more crystals are obtained. M.P. 136–138° C.:

$C_{23}H_{26}O_4N_2$
Theory ____ C, 71.87%; H, 6.77%; N, 7.29%
Found ____ C, 71.90%; H, 6.71%; N, 7.33%

This compound is a base since it has a tertiary amino group and so is capable of forming salts. The following were prepared:

(b) Hydrochloride.—By dissolving the product in alcohol, adding alcoholic hydrochloric acid and some ether. M.P. 226–228° C. Very well soluble in water.

(c) Methyliodide.—By dissolving the base in alcohol and adding methyliodide, after a short while white crystals deposit. M.P. 223–225° C.:

$C_{24}H_{29}O_4N_2.I$
Theory _____ N, 5.31%; I, 22.49%
Found _____ N, 5.37%; I, 22.16%

Example 12

(a) Flavone - 7 - oxy - acetyl - (gamma - cyclo - hexylaminopropyl)-amide (method C)

(R=H; R₁=C₆H₁₁NHCH₂CH₂CH₂—)

Prepared according to Example 11, from flavone-7-oxy-acetyl-methylester and cyclohexyl-propylene-diamine. M.P. 83–85° C.:

$C_{26}H_{29}O_4N_2$
Theory _____ N, 6.61%
Found _____ N, 6.65%

(b) The hydrochloride (M.P. 236–238° C.) was also prepared as per Example 11. The flavone-7-oxy-acetyl-(N-methyl-piperazine)-amide (R and R₁ plus the N atom forming N-methyl-piperazine):

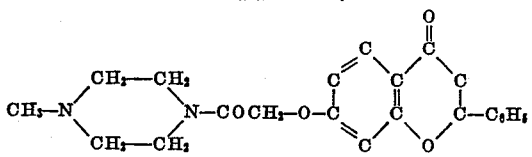

was prepared in the same way. M.P. of the base 128–130° C.:

$C_{22}H_{22}O_4N_2$
Theory _____ N, 7.55%
Found _____ N, 7.67%

Example 13

(a) Flavone - 7 - oxy - acetyl - (gamma - dimethyl-amino-propylene)-amide (method B)

$(R=H; R_1=(CH_3)_2N.CH_2CH_2CH_2-)$ 0.1 ml. flavone 7-oxy-acetylchloride are suspended in dry benzol. To this is slowly added, while stirring and cooling, 0.1 mol gamma-dimethylaminopropylenediamine diluted with some dry benzol. The mixture is now refluxed for a few hours. Upon cooling crystals deposit. They are filtered off and washed with a little alcohol. The free base M.P. 136–140° C.:

$C_{22}H_{24}O_4N_2$
Theory _____ N, 7.56%
Found _____ N, 7.51%

(b) The hydrochloride obtained from alcohol and ether, M.P. 154–156° C.

(c) The methyliodide, M.P. 163–165° C.:

$C_{23}H_{27}O_4N_2.I$
Theory _____ N, 5.43%
Found _____ N, 5.61%

Similarly there were prepared:

(d) Flavone - 7 - oxy-acetyl-(gamma-diethylaminopropylene)-amide $(R=H; R_1=(C_2H_5)_2N.CH_2CH_2CH_2-)$ Free base, M.P. 113–115° C.:

$C_{24}H_{28}O_4N_2$
Theory _____ N 7.03%
Found _____ N, 7.15%

(e) Hydrochloride, M.P. 210–212° C. Flavone-7-oxy-acetyl-(beta-dimenthylaminoethylene)-amide $(R=H; R_1=(CH_3)_2N.CH_2CH_2-)$ M.P. of free base 120–122° C.:

$C_{21}H_{22}O_4N_2$
Theory _____ N, 7.83%
Found _____ N, 7.79%

(f) Flavone-7-oxy-acetyl-(beta-n-dibutylaminoethylene)-amide $R=H; R_1=(n-C_4H_9)_2N.CH_2CH_2-)$ M.P. of free base 93–95° C.:

$C_{27}H_{34}O_4N_2$
Theory _____ N, 6.36%
Found _____ N, 6.44%

(g) Flavone - 7 - oxy-acetyl-(beta-n-dipropylaminoethylene)-amide $(R=H; R_1=(n-C_3H_7)_2N.CH_2CH_2-)$ M.P. of free base 98–100° C.:

$C_{25}H_{30}O_4N_2$
Theory _____ N, 6.79%
Found _____ N, 6.82%

The foregoing is to be considered as generally and particularly descriptive of the nature and scope of the present invention without being exhaustive.

What is claimed is:

1. A compound of the formula

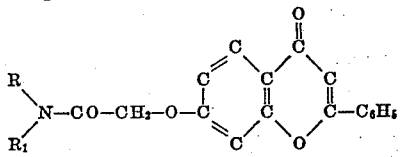

where R and $R_1$ are selected from the group consisting of H, alkyl, cyclohexyl, cyclohexylaminoalkyl, phenylalkyl, phenylalkoxy, phenylalkoxyamino, hydroxyalkyl, hydroxyphenyl, alkoxyalkyl, dialkylaminoalkyl and antipyrinyl, and when taken with the nitrogen atom, R and $R_1$ form groups selected from the group consisting of morpholine, pyrrolidine, piperidine, alkyl piperidine, and tetramethyl piperidine, and the acid addition and methyl quaternary salts of said compounds, wherein $R_1$ and $R_2$ include tertiary amine groups, "alkyl" and "alkoxy" groups in every case consisting of those selected from the groups having from one through four carbon atoms.

2. Flavone-7-oxy-acetic acid amide.
3. Flavone-7-oxy-acetic acid N-diethylamide.
4. Flavone-7-oxy-(acetic acid-(N-beta dimethylamino)-ethylester hydrochloride.
5. Flavone-7-oxy-acetic acid-(beta-diethylamino-ethylene)-amide.
6. Flavone-7-oxy-acetyl-(N-phenylisopropyl)-amide.
7. Flavone-7-oxy-acetyl-(p-ethoxyphenyl)-amide.

No references cited.